United States Patent
Tu

(10) Patent No.: US 9,444,274 B2
(45) Date of Patent: Sep. 13, 2016

(54) METHOD OF DETECTION AND DISPLAY OF CHARGING INFORMATION OF POWER BANK

(71) Applicant: POLYBATT ENERGY TECHNOLOGY CO., LTD., NewTaipei (TW)

(72) Inventor: Tai-Yu Tu, New Taipei (TW)

(73) Assignee: Polybatt Energy Technology Co., Ltd., New Taipei (TW)

(*) Notice: Subject to any disclaimer, the term of this patent is extended or adjusted under 35 U.S.C. 154(b) by 0 days.

(21) Appl. No.: 14/546,054

(22) Filed: Nov. 18, 2014

(65) Prior Publication Data

US 2015/0141081 A1    May 21, 2015

(30) Foreign Application Priority Data

Nov. 18, 2013    (TW) .............................. 102141842 A

(51) Int. Cl.
| | | |
|---|---|---|
| *H04B 1/38* | (2015.01) | |
| *H02J 7/00* | (2006.01) | |
| *H04M 1/725* | (2006.01) | |

(52) U.S. Cl.
CPC ............ *H02J 7/0027* (2013.01); *H02J 7/0054* (2013.01); *H04M 1/72519* (2013.01)

(58) Field of Classification Search
CPC ... H01M 2220/30; H02J 7/0004; H02J 5/005
USPC ....... 455/573, 572, 550.1, 343.1–343.6, 500, 455/517, 445, 422.1, 403, 557, 556.1, 455/414.1–414.4; 370/310, 311, 328, 329; 320/107, 112, 114, 137; 379/433.01, 379/433.08, 455
See application file for complete search history.

(56) References Cited

U.S. PATENT DOCUMENTS

| | | | |
|---|---|---|---|
| 7,216,246 B2 | 5/2007 | Ozeki et al. | |
| 2008/0136372 A1 | 6/2008 | Eto | |
| 2010/0302980 A1* | 12/2010 | Ji ....................... | H04W 52/0216 370/311 |
| 2011/0001457 A1 | 1/2011 | Mueller | |
| 2012/0153891 A1* | 6/2012 | Yang .................... | H02J 7/0052 320/107 |
| 2013/0134923 A1* | 5/2013 | Smith ...................... | G06F 1/26 320/103 |
| 2013/0205159 A1* | 8/2013 | Chen ........................ | G06F 1/28 713/340 |
| 2014/0046707 A1 | 2/2014 | Hama | |

FOREIGN PATENT DOCUMENTS

| | | |
|---|---|---|
| CN | 1622004 A | 6/2005 |
| JP | 2000323182 A | 11/2000 |
| JP | 2007110820 A | 4/2007 |

* cited by examiner

*Primary Examiner* — Keith Ferguson
(74) *Attorney, Agent, or Firm* — Alan D. Kamrath; Kamrath IP Lawfirm, P.A.

(57) ABSTRACT

A method of detection and display of charging information of power bank is provided and used when a mobile electronic device is charged by a power bank via a charging transmission device. The method of detection and display of charging information of power bank includes an information acquisition step, an integrating and computing step, and an information output step. In the information acquisition step, a power bank parameter information and a device parameter information are provided based on a choice. The power bank parameter information and the device parameter information are transmitted to a computing module of a process unit of the mobile electronic device. In an integrating and computing step, a charging information is produced after the power bank parameter information and the device parameter information are integrated or computed. In an information output step, the charging information is transmitted to a display element of the mobile electronic device.

5 Claims, 6 Drawing Sheets

METHOD OF DETECTION AND DISPLAY OF CHARGING INFORMATION OF POWER BANK

BACKGROUND OF THE INVENTION

1. Field of the Invention

The invention relates to a method of detection and display of charging information of mobile power bank, and more particularly relates to a method which can make the charged mobile electronic device compute and display the charging information of the power bank.

2. Description of the Prior Art

Please refer the FIG. 1. The smart phone and the tablet PC have become very popular mobile electronic product 1 at present. The users often use the power bank 2 to charge the mobile electronic product 1 or replace the battery of the mobile electronic product 1 when the power shortage of the battery is occurred. Therefore, the mobile electronic product 1 can keep working. The detail structure and the principle of the power bank 2 would be understood by a person having ordinary skill in the art, so it would not be explained in detail in the following.

The mobile electronic product 1 can be charged by connecting to the power bank 2 of the prior art, but during charging only power (or energy) is exchanged between the power bank 2 and the mobile electronic product 1, and other relational information is not acquired, integrated, or used, so it causes some problem about the convenience of the power bank. For example, the user can not know that how many times can power bank 2 charged for the mobile electronic products 1, they only can estimate the approximate data, so it will always miss to charge the power bank 2 and make the power bank 2 and the mobile electronic products 1 both out of charged, and it is not convenience and practicality for the product, it becomes a very practical and urgent technical issue for how to invention a detect and display the action information of power charging method.

SUMMARY OF THE INVENTION

The traditional power bank cannot acquire and provide useful charging information such as the charged frequency during the charging, so the user only estimates the remaining power of the power bank based on the user's experience, but it's not practical and convenient. Therefore, the object of the present invention is to provide a method making the charged electronic device to compute and display the charging information of the power bank.

To achieve the above object a method of detection and display of charging information of power bank is provided. The method of detection and display of charging information of power bank is configured to being used when a mobile electronic device is charged by a power bank via a charging transmission device. The method of detection and display of charging information of power bank includes an information acquisition step, an integrating and computing step, and an information output step. In the information acquisition step, a power bank parameter information and a device parameter information are provided based on a choice. The power bank parameter information and the device parameter information are transmitted to a computing module of a process unit of the mobile electronic device. In an integrating and computing step, a charging information is produced after the power bank parameter information and the device parameter information are integrated or computed. In an information output step, the charging information is transmitted to a display element of the mobile electronic device.

Due to the information acquisition step and the integrating and computing step in the present invention, the user can browse the useful charging information such as recharging frequency when the phone is charged by the power bank. The user can understand the state of the power bank, so the user can charge the power bank when the power of the power bank is not enough, and the power bank and mobile electronic products both out charged can be avoided. Thus, the practicality and the convenience of the power bank can be effectively increased in the present invention.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
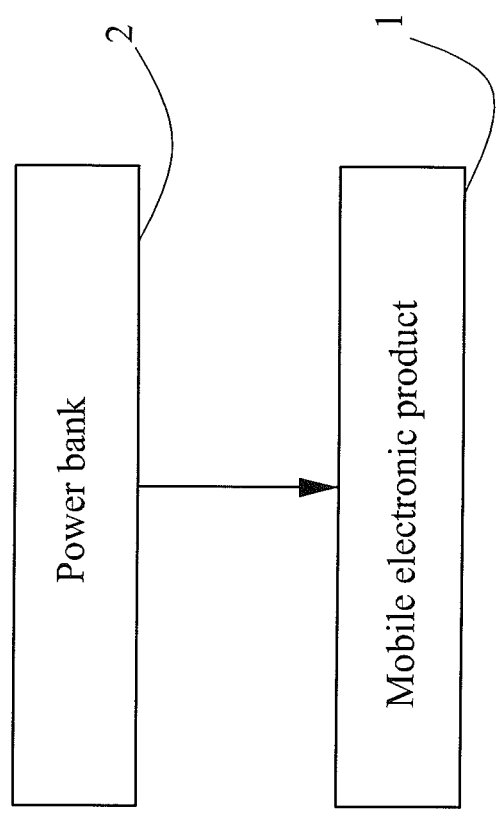
FIG. 1 shows an architecture block diagram of the prior art.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 2:
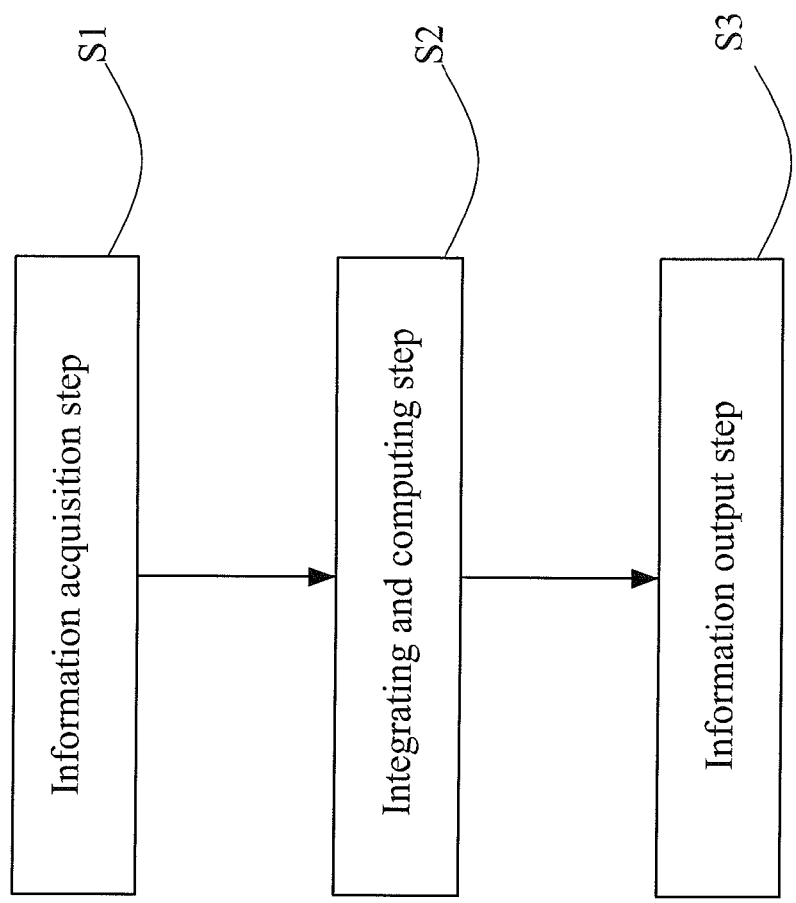
FIG. 2 shows a step block diagram of the present invention.
Figure 3:
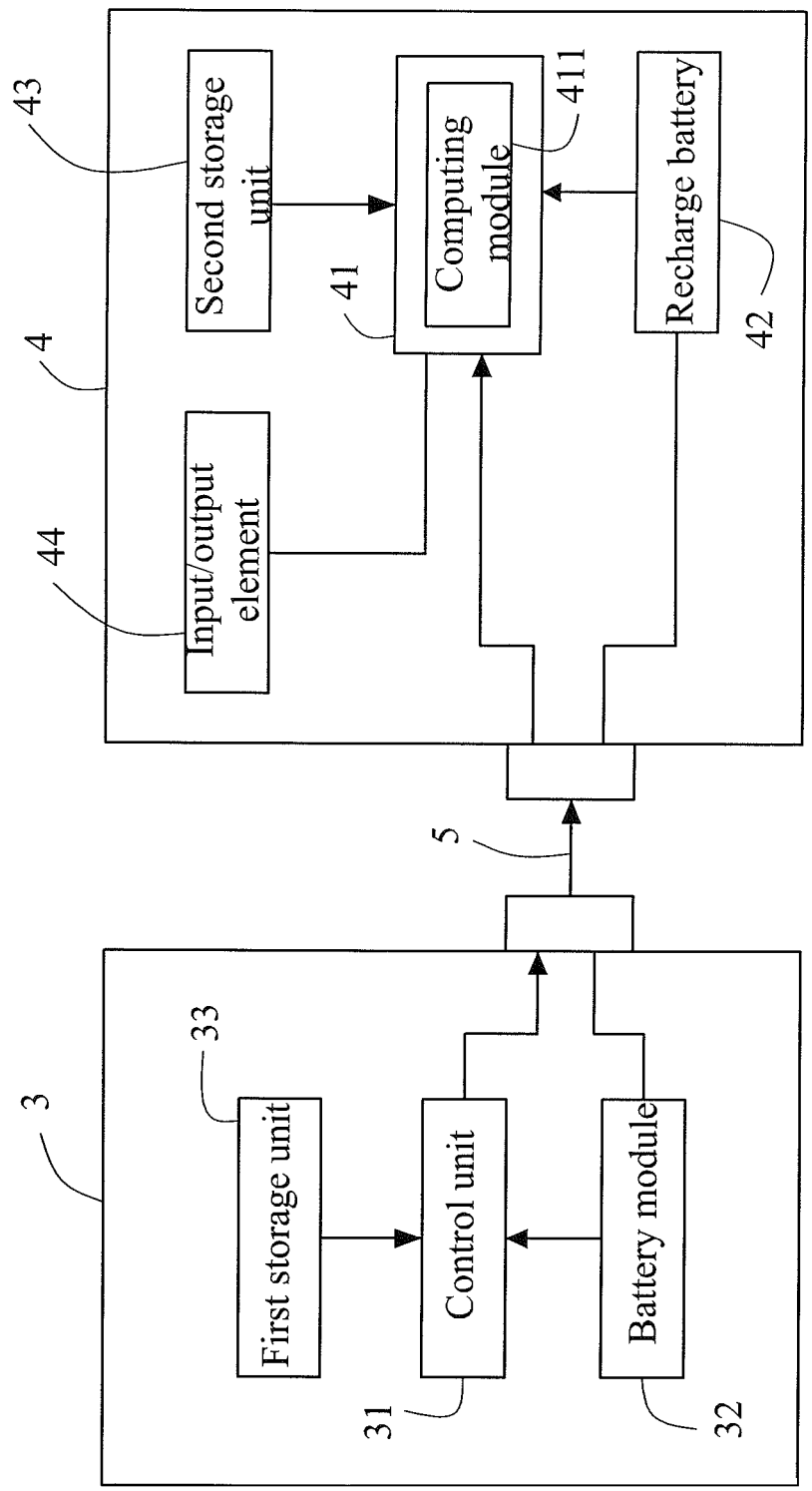
FIG. 3 shows an action diagram of the information acquisition step of the present invention.
Figure 3B:
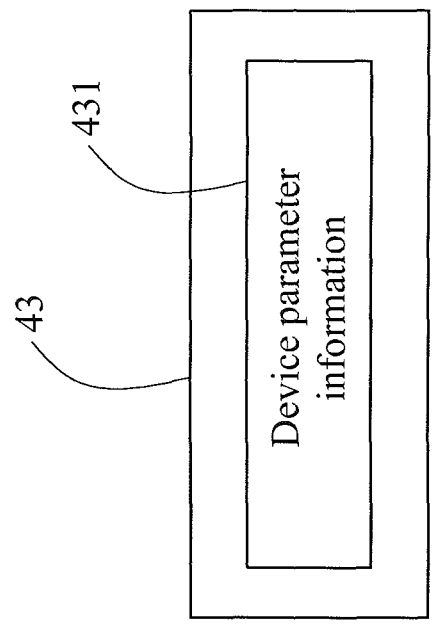
FIG. 3B shows a detail block diagram of the second storage unit of the present invention.
Figure 3A:
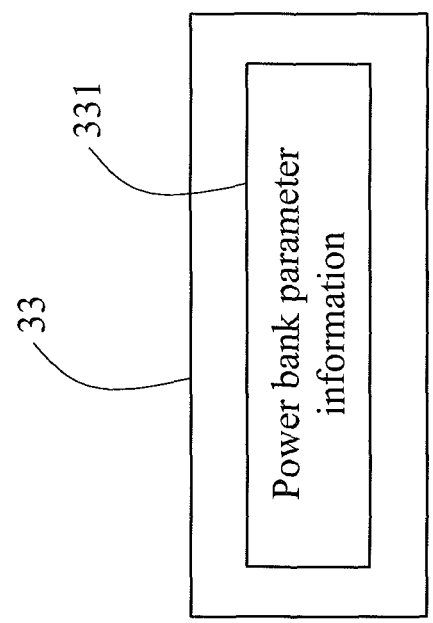
FIG. 3A shows a detail block diagram of the first storage unit of the present invention.

Please refer to the FIG. 2 and FIG. 3. A method of detection and display of charging information of power bank is provided by the present invention. The method of detection and display of charging information of power bank is used when a mobile electronic device 4 is charged by a power bank 3 via a charging transmission device 5, and the method includes following step:

An Information Acquisition Step S1:

Please refer to FIG. 3A and FIG. 3B. The information acquisition step S1 provides at least a power bank parameter information 331 of the power bank 3 and at least a device parameter information 431 of mobile electronic device 4 are pre-determined (for example: based on a user's choice), and the power bank parameter information 331 and the device parameter information 431 are transmitted to a computing module 411 of a process unit 41 of the mobile electronic device 4.

The power bank parameter information 331 is saved in the first storage unit 33 of the power bank 3. The power bank 3 further includes a control unit 31 and a battery module 32. The control unit 31 is electrically connected to the battery module 32 and the first storage unit 33. In detail, the battery module 32 is a recharge battery configured for saving energy and charging the mobile electronic device 4, and the recharge battery is such as Li-ion battery, Li-polymer battery, or Ni-MH battery. The first storage unit 33 is a flash memory or other non-volatile memory. Moreover, the power bank parameter information 331 is the information about the battery module 32, for example: battery capacity, remaining power, charging current, temperature, or product serial number, etc. In addition, the control unit 3 and other elements (such as temperature sensor or power manage chip) for generating the power bank parameter information 331 are understood by a person having ordinary skill in the art, so they are not explained in detail in the present invention.

The charging transmission device 5 is such as a charging transmission lines or a wireless charging device. Therefore, the power bank 3 can charge or exchange information with the mobile electronic device 4. In this embodiment, the charging transmission device 5 is a USB line. The detail structure and the principle of the wireless charging device is prior art, so it would not be explained in detail hereinafter. The mobile electronic device 4 is a smart phone or a tablet PC. The device parameter information 431 is saved in the second storage unit 43 of the mobile electronic device 4. The mobile electronic device 4 further includes a recharging battery 42 and an input/output element 44. The process unit 41 is electrically connected to recharging battery 42, the second storage unit 43, and input/output element 44. The recharge batter 42 is Li-ion battery, Li-polymer battery, or Ni-MH battery. The second storage unit 43 is a flash memory or other non-volatile memory. The input/output element 44 is a touch screen, but in other embodiment the input/output element 44 also can be composed of an individual keyboard and screen. The device parameter information 431 is information about the recharging battery 42 of mobile electronic device 4, for example: battery capacity, remaining power, or type of the mobile electronic device 4, etc. Moreover, the computing module 411 is a special circuit module or an application (APP), it is configured to provide a operation interface in the input/output element 44. Therefore, the computing module 441 can acquire the power bank parameter information 331 and the device parameter information 431 from the operation interface based on the operation commanding selected or inputted by the user.

An Integrating and Computing Step S2:

A charging information is produced after the power bank parameter information 331 and the device parameter information 431 acquired in the information acquisition step S1 are integrated or computed.

In this step, the charging information means the remaining charging time (how many charging times the power bank 3 has), the current temperature of the mobile electronic device 4, the current temperature of the power bank 3, the impedance of the charging transmission line (over-high impedance represents the charging transmission line is abnormal), etc. The above said computing includes one or all of the following method: sifting of information, the logic determining of condition, or the computing of value. In this embodiment, the charging information is the remaining charging times. In this moment, the power bank parameter information 331 is the real remaining power of the battery module 32 (such as 6000 mAh), and the device parameter information 431 is battery capacity and remaining power of the battery module 42 (such as 2000 mAh and 1000 mAh). Therefore, the computing module 411 can produce the charging information after the computing module 411 integrates and computes the above said information. Therefore, the remaining charging time is 3.5 times computed by following equation:

$$1+(6000-1000)\div 2000=3.5$$

Figure 3C:
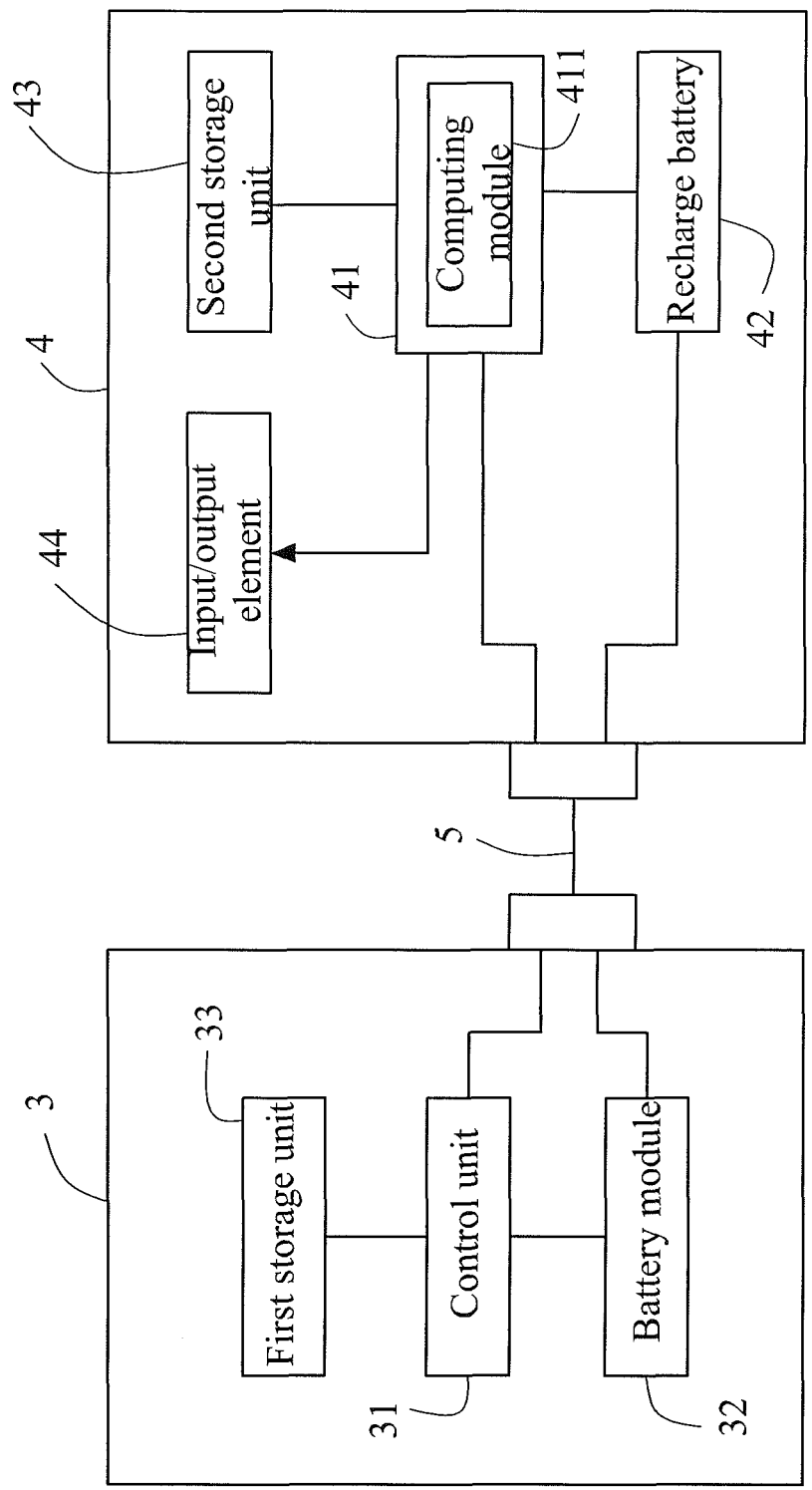
FIG. 3C shows an action diagram of the information output step of the present invention.

An Information Output Step S3:

Please refer FIG. 3C. The charging information produced in the integration and computing step S2 is transmitted and displayed on the input/output element 44 of the mobile electronic device 4. In this embodiment, a message "remaining charging times: 3.5" would be displayed on the touch screen of the mobile electronic device 4. Therefore, the method of detection and display of charging information of power bank is completed.

Furthermore, if the mobile electronic device 4 has speech output function, the charging information can be played via the speech output function. Thus, the convenience of the present invention can be effectively increased.

Please refer the FIG. 2 and the FIG. 3. The user can browse the useful charging information such as remaining charging times when the phone is charged by the power bank 3. The user can understand the state of the power bank, so the user can charge the power bank charged when the power of the power bank is not enough, and the power bank and mobile electronic products both out charged can be avoided. Thus, the practicality and the convenience of the power bank can be effectively increased in the present invention.

Figure 4:
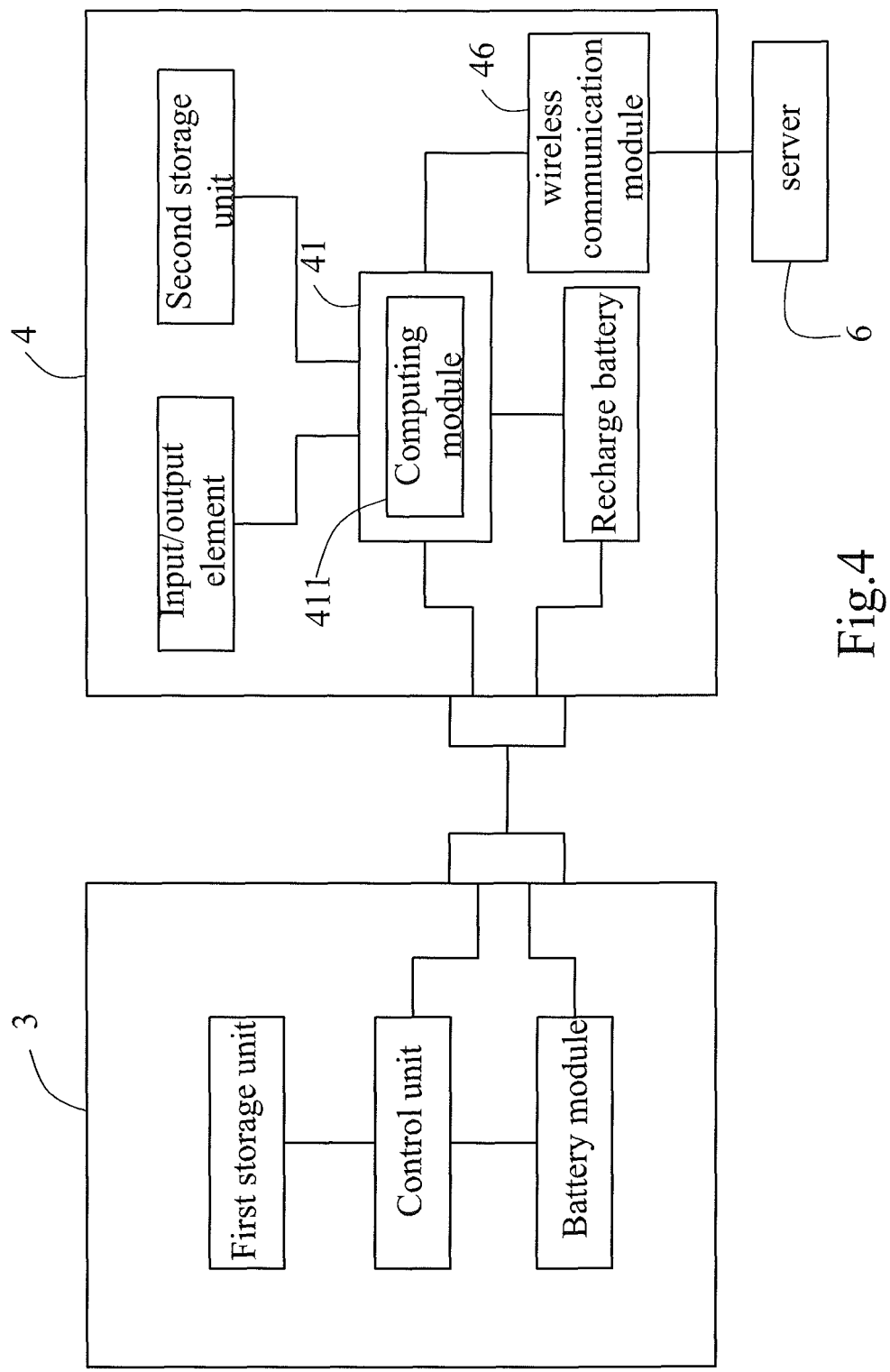
FIG. 4 shows an architecture block diagram of the second embodiment of the present invention.

Please refer the FIG. 4. FIG. 4 shows the second embodiment of the present invention. The charging information is also transmitted to an external server 6 by the computing module 41 via a wireless communication module 46 (such as Bluetooth module, Wi-Fi module, or 3G mobile internet module) of the mobile electronic device 4. For example: the charging information is product serial number of the power bank 3. Therefore, the power bank 3 can be automatically registered when the mobile electronic device is charged by power bank 3. Moreover, the user also can download the instructions and other information from the server 6, and the user does not need to register by hand or save other warranty document. Thus, the after sale service and added value of the power bank 3 can be effectively improved in the present invention.

While the preferred embodiment of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A method of detection and display of charging information of power bank, configured for being used when a mobile electronic device charged by a power bank via a charging transmission device, comprising:
    an information acquisition: providing at least a power bank parameter information comprising a product serial number of the power bank and at least a device parameter information comprising a type of the mobile electronic device based on choice, the power bank parameter information and the device parameter information transmitted to a computing module of a process unit of the mobile electronic device;
    an integrating and computing: producing a charging information after the power bank parameter information and the device parameter information integrated or computed by the computing module;
    an information output: making the charging information being transmitted to a input/output element of the mobile electronic device and further transmitting the charging information to an external server via a wireless communication module of the mobile electronic device by the computing module.

2. The method of detection and display of charging information of power bank of claim 1, wherein the computing module in the information acquisition is a special application (APP) configured to provide an operation interface on the input/output element, and acquire the power bank parameter information and the device parameter information based on an operation command.

3. The method of detection and display of charging information of power bank of claim 1, wherein the charging transmission device is a charging transmission wire or a wireless charging device.

4. The method of detection and display of charging information of power bank of claim 1, wherein the charging information is a remaining power, a remaining charging time, a current temperature of the mobile electronic device, a current temperature of the power bank or an impedance of the charging transmission wire.

5. The method of detection and display of charging information of power bank of claim 1, wherein the integrating and computing further comprises at least one of the following: sifting of information, logic determining of condition or computing of value.

* * * * *